(12) United States Patent
Zhang et al.

(10) Patent No.: US 10,438,217 B1
(45) Date of Patent: Oct. 8, 2019

(54) ESTIMATING AN OUTPUT BASED ON ROBUSTNESS ASSOCIATED WITH MULTIPLE INPUT VARIABLES

(71) Applicant: Amazon Technologies, Inc., Seattle, WA (US)

(72) Inventors: Chengliang Zhang, Seattle, WA (US); Ali Sadighian, Seattle, WA (US); Tolga Han Seyhan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 825 days.

(21) Appl. No.: 14/796,192

(22) Filed: Jul. 10, 2015

(51) Int. Cl.
*G06Q 10/00* (2012.01)
*G06Q 30/02* (2012.01)

(52) U.S. Cl.
CPC ................. *G06Q 30/0202* (2013.01)

(58) Field of Classification Search
None
See application file for complete search history.

(56) References Cited

U.S. PATENT DOCUMENTS

| | | | | |
|---|---|---|---|---|
| 4,744,026 A | * | 5/1988 | Vanderbei | G06Q 10/06 379/112.05 |
| 4,744,027 A | * | 5/1988 | Bayer | G06Q 10/06 379/112.05 |
| 4,744,028 A | * | 5/1988 | Karmarkar | G06Q 10/04 700/99 |
| 5,148,365 A | * | 9/1992 | Dembo | G06Q 10/06 705/36 R |
| 5,799,287 A | * | 8/1998 | Dembo | G06Q 40/08 705/36 R |
| 5,930,762 A | * | 7/1999 | Masch | G06F 17/10 705/7.28 |
| 6,002,863 A | * | 12/1999 | Sheer | G06Q 99/00 703/22 |
| 8,386,323 B1 | * | 2/2013 | Chenault | G06Q 30/06 705/22 |
| 8,732,040 B1 | * | 5/2014 | Prabhune | G06Q 20/203 705/22 |
| 9,465,772 B2 | * | 10/2016 | Taniguchi | G06F 17/10 |
| 2002/0072956 A1 | * | 6/2002 | Willems | G06Q 10/04 705/7.31 |

(Continued)

OTHER PUBLICATIONS

Georgia Perakis and Guillaume Roels (Regret in the Newsvendor Model with Partial Information, Published by: INFORMS, Source: Operations Research, vol. 56, No. 1 (Jan.-Feb. 2008), pp. 188-203). (Year: 2008).*

(Continued)

*Primary Examiner* — Hafiz A Kassim
(74) *Attorney, Agent, or Firm* — Kilpatrick Townsend & Stockton LLP

(57) ABSTRACT

Techniques associated with determining a quantity of an item to inventory may be described. In particular, statistical data about variables associated with the item may be accessed. The statistical data may be generated based on historical realizations of the variables. The quantity may be computed based on this data. For example, a plurality of regrets corresponding to inventorying a plurality of quantities of the item may be generated based on the statistical data. The quantity may be determined from the plurality of quantities as one corresponding to an acceptable regret from the plurality of regrets.

16 Claims, 7 Drawing Sheets

(56) References Cited

U.S. PATENT DOCUMENTS

| | | | | |
|---|---|---|---|---|
| 2003/0004777 | A1* | 1/2003 | Phillips | G06Q 10/04 705/7.28 |
| 2003/0018513 | A1* | 1/2003 | Hoffman | G06Q 10/06 705/7.32 |
| 2003/0065478 | A1* | 4/2003 | Takeuchi | G06F 17/18 702/181 |
| 2005/0192865 | A1* | 9/2005 | Boutilier | G06Q 30/0275 705/14.71 |
| 2007/0055585 | A1* | 3/2007 | Agrawal | G06Q 10/063 705/28 |
| 2008/0147490 | A1* | 6/2008 | Najmi | G06Q 10/00 705/7.37 |
| 2009/0187468 | A1* | 7/2009 | Krech | G06Q 10/087 705/28 |
| 2010/0076806 | A1* | 3/2010 | Grichnik | G06Q 10/06315 705/7.25 |
| 2010/0161345 | A1* | 6/2010 | Cain | G06F 19/328 705/2 |
| 2010/0312611 | A1* | 12/2010 | Henderson | G06Q 10/04 705/7.36 |
| 2012/0054076 | A1* | 3/2012 | Wu | G06Q 10/087 705/28 |
| 2012/0173304 | A1* | 7/2012 | Hosoda | G06Q 10/087 705/7.31 |
| 2013/0297463 | A1* | 11/2013 | Garber | G06Q 10/087 705/28 |
| 2015/0006335 | A1* | 1/2015 | Vasantham | G06Q 20/203 705/28 |
| 2015/0142513 | A1* | 5/2015 | Shnayder | G06Q 30/0206 705/7.31 |
| 2015/0302510 | A1* | 10/2015 | Godsey | G06Q 30/0635 705/26.81 |
| 2016/0092813 | A1* | 3/2016 | Baker | G06Q 10/06313 705/7.23 |
| 2016/0253607 | A1* | 9/2016 | Xu | G06Q 10/06 705/7.28 |

OTHER PUBLICATIONS

Zuo-Jun Max Shen (Integrated Supply Chain Design Models: A Survey and Future Research Directions, Journal of Industrial and Management Optimization vol. 3, No. 1, Feb. 2007). (Year: 2007).*

Omar Besbes, Assaf Zeevi (On the Minimax Complexity of Pricing in a Changing Environment, Operations Research, vol. 59, No. 1, pp. 66-79 (Jan. • Feb. 2011)) (Year: 2011).*

John M. Mulvey and Robert J. Vanderbei (Robust Optimization of Large-Scale Systems, Operations Research, vol. 43, No. 2, Mar.-Apr. 1995). (Year: 1995).*

Anssi Kaki, Ahti Salo, Srinivas Talluri (Impact of the shape of demand distribution in decision models for operations management, Computers in Industry 64 (2013) 765-775) (Year: 2013).*

Anna Bonfill Teixidor (Proactive management of uncertainty to improve scheduling robustness in process industries, A thesis submitted for the degree of Doctor Universitat Politµecnica de Catalunya Barcelona, Jul. 2006) (Year: 2006).*

J. C. Lang (Production and Operations Management: Models and Algorithms, Production and Inventory Management with Substitutions, Lecture Notes in Economics and Mathematical Systems 636, DOI 10.1007/978-3-642-04247-8_2, Springer-Verlag Berlin Heidelberg 2010) (Year: 2010).*

Tiravat Assavapokee, Matthew J. Realff, Jane C. Ammons, I-Hsuan Hong (Scenario relaxation algorithm for finite scenario-based min-max regret and min-max relative regret robust optimization, ScienceDirect, Computers & Operations Research 35 (2008) 2093-2102) (Year: 2008).*

Gallego, G. and Moon, I. The distribution free newsboy problem: review and extensions. *Journal of the Operational Research Society*, pp. 825-834 (1993).

Perakis, G. and Roels, G. Regret in the newsvendor model with partial information. *Operations Research*, 56(1), 188-203 (2008).

Savage, L. J. The theory of statistical decision. Journal of the American Statistical association, 46(253), 55-67 (1951).

\* cited by examiner

ESTIMATING AN OUTPUT BASED ON ROBUSTNESS ASSOCIATED WITH MULTIPLE INPUT VARIABLES

BACKGROUND

More and more users are turning to network-based resources, such as electronic marketplaces, to purchase items (e.g., goods and/or services). For example, a network-based resource may offer a large and diverse selection of items. Further, for some of the items, there may be a number of sellers with different offers. As such, a customer may not only have access to a rich item selection, but may also obtain items at the most convenient offers.

Typically, a service provider of a network-based resource may coordinate with multiple entities to offer items. For example, the service provider may communicate with sellers to list the items at the network-based resource and with inventory planners to acquire and store a certain number of the items in storage. Based on the coordination, the service provider may decide on quantities of items to store. Accordingly, the service provider may offer some of the items as available from the storage.

BRIEF DESCRIPTION OF THE DRAWINGS

Various embodiments in accordance with the present disclosure will be described with reference to the drawings, in which.

DETAILED DESCRIPTION

Figure 1:
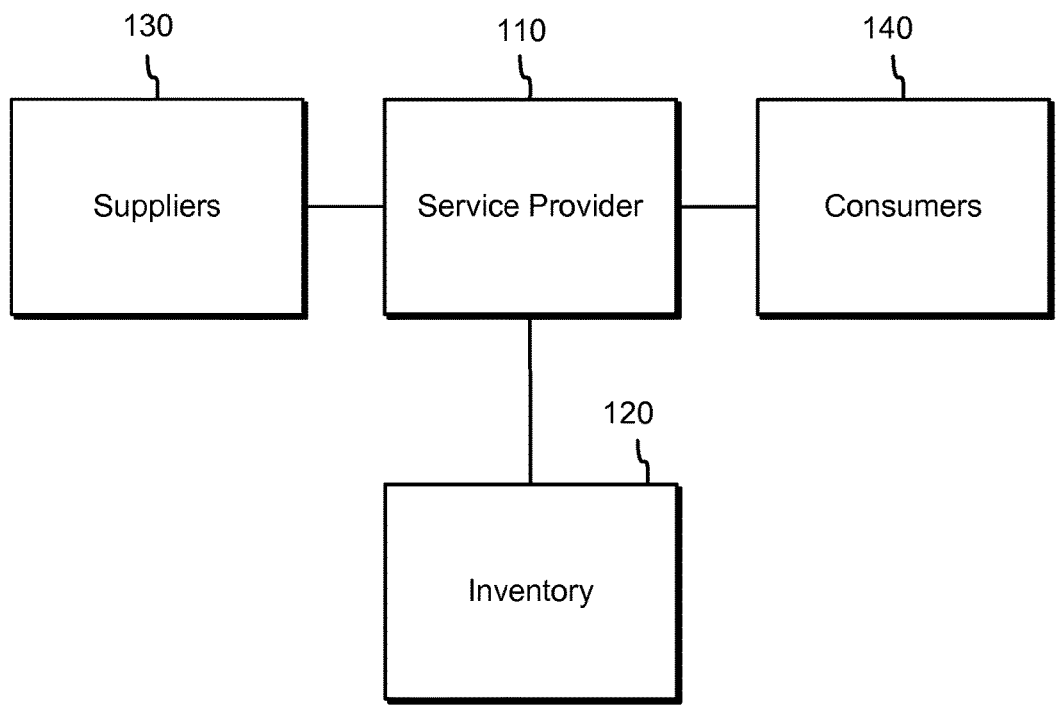
FIG. 1 is a block diagram illustrating an example environment for offering items at a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, efficiently analyzing variables to enhance item inventory planning Typically, a service provider that provides a network-based resource, such as a web site for accessing an electronic marketplace, may operate various computing devices and associated modules to offer items at the network-based resource. Some of the items may be obtained from sellers and/or other entities, stored as inventory, and offered to customers as in-stock items. A customer may be enticed to purchase an in-stock item because of, for example, a shorter delivery flow. To determine how many items to store in the inventory, the service provider may use a quantity computing module configured to generate an inventory decision. The inventory decision may indicate quantities of the items to inventory based on a number of variables. However, some of the variables may be random. For example, the demand of customers, the supply of sellers, the lead time to acquire the items for inventorying, and/or the cost associated with the acquisition may be random. Thus, the quantity computing module may consider and analyze a large number of variables, many or all of which may be random, to generate the inventory decision.

Various approaches may be used to analyze the different random variables and output quantities for inventorying purposes. In one example approach, distribution functions generated from historical realizations (e.g., actual observed values) of the variables may be used. For example, a demand distribution function may be generated based on historical realizations of the demand variable. Similarly, a lead time distribution function may be generated based on historical realizations of the lead time variable. Generally, a distribution function may represent a function describing likelihoods of values that the respective variable may take. Normal distribution functions and cumulative distribution functions may be an example of a distribution function. Under this approach, analyzing the distribution functions to determine the quantities to inventory may be implemented as a solution to an optimization problem. For example, an objective function may be used to find an optimal quantity out of various possible quantities that may optimize an optimization parameter (e.g., maximize profit, minimize cost) given the different distribution functions. Importantly, the accuracy and optimality of this approach may depend on the quality of the distribution functions.

In various situations, the quality of a distribution function may not be trusted. For example, the historical realizations of the respective variable (e.g., the amount of available historical data) may be statistically insufficient to generate the distribution function. In another example, an inventory decision for an item may cover a planning horizon. The planning horizon may represent a period of time during which a quantity of the item may be acquired and inventoried. Generally, the longer the planning horizon may be, the less trusted the distribution function of the variable may become. In both and other similar examples, the optimality of the quantity may decrease with a decrease in the trust of the distribution function.

In another example approach, robustness around the variables may be used when the quality of distribution functions is untrusted. In particular, the robustness may be built around a variable having an untrusted distribution function (or for a plurality of such variables). The robustness may represent a measure used to generate the inventory decision independently of the distribution function (or a plurality of distribution functions). In an example, a set of discrete statistics may be used as the robustness measure, such as an average, a median, a mean, a mode, a variance, and/or a range. These statistics may be derived from the available historical realizations of the variable and/or from the distribution function.

Under the robustness approach, the optimality of the quantity may be improved by building robustness around variables having untrusted distribution functions. In many situations, more than one variable may have an untrusted distribution function. Thus, under this approach, finding the optimal quantity may span multiple dimensions of robustness (e.g., for the different variables).

In an example of the multi-dimensional robustness approach, to generate an inventory decision about an item, statistical data about at least two variables associated with the item may be analyzed. The analysis may include finding an optimal quantity based on reducing regret. The regret may represent a change in an optimization parameter (e.g., a decrease in profit or an increase in cost). The change may correspond to a change in an estimated value of the optimization parameter given a selected quantity relative to another quantity available for selection. The quantity that may reduce the regret the most (or below an acceptable threshold) may represent the optimal quantity. In other words, because the corresponding distribution functions may be untrusted, robustness decisions may be made such that the selected quantity may reduce (e.g., minimize) the regret relative to making a fully informed decision (e.g., a decision based on true knowledge or trusted data about the different variables).

To illustrate, consider an example of a demand variable and a lead time variable having untrusted distribution functions. Averages and variances may be generated from historical realizations of the two variables. This statistical data may be provided to a minimax regret model. The minimax regret model may be configured to find the optimal quantity based on selecting a quantity from a plurality of potential quantities. The selected quantity may minimize a maximum regret, such as the maximum decrease in profit or the maximum increase in cost. In particular, the minimax regret model may compute different maximum regrets for the different potential quantities based on the averages and variances. Once computed, the minimax regret model may select the smallest of the maximum regrets and set the corresponding quantity as the optimal quantity.

In the interest of the clarity of explanation, embodiments may be described herein using examples of averages and variances of a demand variable and a lead time variable. However, the embodiments are not limited as such. Instead, the embodiments may similarly apply to other types of variables (e.g., to also supply and cost variables) and/or to a higher number of variables. Further, the embodiments may similarly apply to other statistics about the variables (e.g., to also ranges, different average types).

In the interest of the clarity of explanation also, embodiments may be described herein using examples of minimizing regret with respect to a decrease in profit. However, the embodiments are not limited as such. Instead, the embodiments may similarly apply to other types of regret (e.g., to also revenue decline, sales decline, cost increase). Further, the embodiments may similarly apply to other optimization parameters (e.g., to also a price at which an item may be offered).

Turning to FIG. 1, the figure illustrates an example environment configured to implement a multi-dimensional robustness approach in order to generate an inventory decision. The inventory decision may include a quantity of an item to inventory during a planning horizon. More particularly, the illustrated environment includes a service provider 110 having access to an inventory 120 of items. The service provider 110 may obtain some of the items from suppliers 130 or from other sources. The service provider 110 may store the obtained items in the inventory 120 until ordered by customers 140. The customers 140 may include recipients or end-users of the items. However, not all of the items may be inventoried. Instead, the service provider 110 may facilitate a service for the customers 140 to obtain items directly from the suppliers 130 or from other sources.

In an embodiment, the service provider 110 may operate a network-based resource (e.g., a web site) as a part of an electronic marketplace, to provide various types of services. Generally, the network-based resource may provide network pages or documents (e.g., web pages) associated with and/or describing the items offered through the marketplace ("item pages" or "item detail pages"). An item page may include information about an item, such as descriptions of the item, related offers, identifiers of suppliers of the item, and other information. Among this information, the item page may display an in-stock attribute for the item. An in-stock attribute may represent an indication that the item may be or is about to be available in the inventory 120. In comparison, if the item is not available, the item page may display an out-of-stock attribute.

The suppliers 130 may operate computing devices to access the network-based resource over a network. A supplier may represent a seller, reseller, retailer, merchant, manufacturer, vendor, and/or another entity involved in providing items. The access of a supplier may enable various types of supplier-related transactions, such as offering items, updating offers of items, and/or canceling offers. In an example, the suppliers 130 and/or the service provider 110 may also use the network-based resource to offer price matching, promotions, markdowns, and/or vendor-associated list prices (e.g., changes to offered prices) for particular items.

Similarly, the customers 140 may operate computing devices to also access the network-based resource over a network. A customer may represent an end user, a consumer, a recipient of the item, and/or a potential recipient or user associated with obtaining the item. The access of a customer may enable various customer-related transactions, such as browsing, searching, purchasing, returning, and/or reviewing items. In particular, a customer may access an item page associated with an item, review the information about the item, and make a purchasing decision. As part of the purchase decision, the customer may consider the in-stock attribute. For example, the customer may be enticed to purchase the in-stock item over an out-of-stock item because of the potentially shorter delivery time.

In an embodiment, the inventory 120 may represent a warehouse, a fulfillment center, a data center, a content distribution center, or some other storage resource for storing items. Typically, an inventory management system may control operations of the inventory 120. An example inventory management system is further described in FIG. 2.

In an example, the service provider 110 and/or other users may operate the inventory management system. For instance, various entities or organizations represented by the service provider 110 may provide input to and receive output from the inventory management system. In general, inputs and outputs of a user may include data related to inventoried items, such as how many units of an item may have been inventoried, how many of the units may have been sold, sale prices, an amount of demand for an item (e.g., the number of requests for information about the item or the number of actual sold units), variations in prices over time, variations in demand over time, variations in lead time, and/or other inventory-related data.

To illustrate, a manager of a particular item category (e.g., televisions) may use the inventory management system to search and find the number of inventoried items of that category and to input data related to how many items may have been sold, the sale prices, and/or capacity to store additional items in the inventory 120. In another example, the suppliers 130 and/or third parties may additionally or alternatively operate the inventory management system. For instance, the suppliers 130 may input information in the inventory management system describing the various available items, associated prices, lead times, capacity to provide the items, and other supplier related information.

As such, the inventory management system may facilitate the management of the inventory 120. Further, inventory-related data generated as part of this management or in association with inputs and outputs of the different users may be accessed by a quantity computing module. The quantity computing module may be configured to analyze the data and, accordingly, compute quantities of items to be inventoried during a planning horizon. In turn, the inventory management system may use these quantities to generate an inventory plan. This plan may include, for example, purchase orders, storage accommodations, and/or other inventory-related planning based on the quantities.

In an embodiment, the quantity computing module may implement a multi-dimensional robustness approach. For example, rather than using distribution functions, the quantity computing module may use discrete statistics about multiple random variables (e.g., demand and lead time variables). The quantity computing module may implement a regret model, such as a minimax regret model, to use the statistics and, accordingly, output the optimal quantities.

A demand variable for an item may represent a demand of, for example, the customers 140 for the item. The demand may be observed at the network-based resource based on requests, orders, purchases, and/or returns of the item. The demand may randomly vary based on different factors. For example, if the item is promoted, depending on a season (e.g., a holiday week), if the item is trending, if an amount of publicity about the item increases (e.g., through a news article), and/or other factors, the demand may randomly vary. This randomness may result in peaks and valleys of the demand variable in certain situations. Thus, in such situations, a demand distribution function generated from historical demand realizations may be untrusted.

A lead time variable for an item may represent a lead time of providing a quantity of the item from the suppliers 130 to the inventory 120, for example. This lead time may include a period of time for designing and/or producing the quantity of the item and a time for shipping and delivering the quantity of the item to the inventory 120. The lead time may also randomly vary based on different factors. For example, if a production strike occurs, an unplanned supply constraint emerges, shipment is delayed, a supplier is overcommitted, and/or other factors, the lead time may randomly vary. A lead time distribution function generated from historical lead time realizations may be untrusted because of the unpredictability or uncertainty of the different factors.

Further, the variability of the lead time may impact the variability of the demand and, vice versa. For example, if during a planning horizon, the lead time changes (e.g., increases), the quantity that may be inventoried during that planning horizon may also change (e.g., decrease if, for instance, the lead time extends beyond the planning horizon). The change in the quantity may, in turn, impact the demand for the item. For example, a decrease in the quantity may result in the item becoming out-of-stock during the planning horizon, which may cap the demand.

Thus, rather than using untrusted distribution functions of the demand and lead time variables, the quantity computing module may use robustness built around the two variables. By implementing the multi-dimensional approach, optimal quantities may be computed. The optimality of the quantities may be an improvement over quantities computed based on the distribution functions. This improvement may in turn improve the optimization parameter (e.g., increasing an overall profit). The improvement may also improve the underlying operations of the inventory management system of the service provider 110 and/or the suppliers 130. In particular, an improved inventory management plan may be generated and used.

Figure 2:
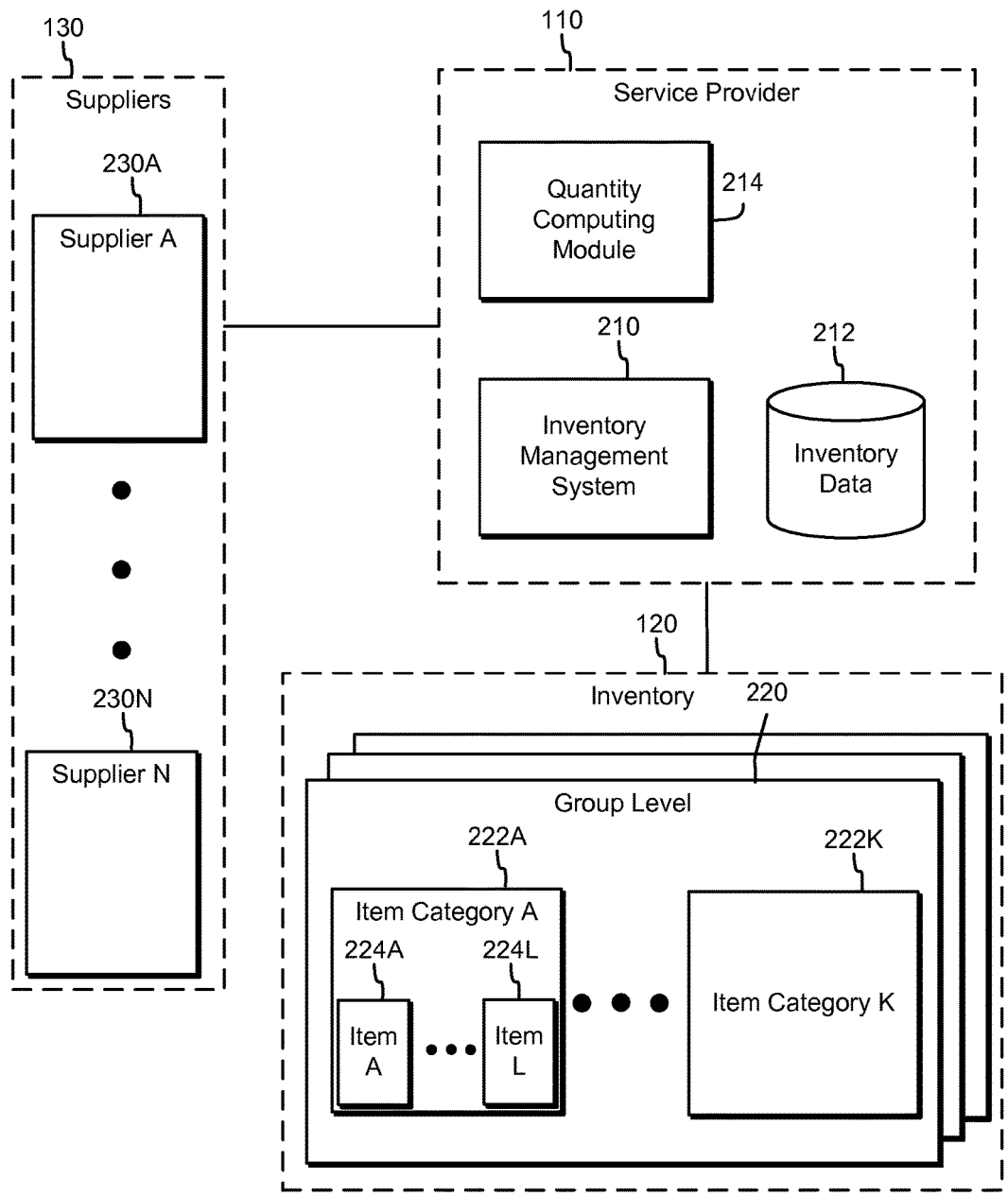
FIG. 2 is a block diagram illustrating example systems associated with inventorying items, according to embodiments.

The inventory management system and the quantity computing module may be used in conjunction to generate inventory plans for items over recurring planning horizons. FIG. 2 illustrates an example of an environment for using these two components in conjunction. In particular, the service provider 110 may operate an inventory management system 210 to manage inventory data 212. The service provider 110 may also operate a quantity computing module 214 to access and analyze the inventory data 212.

The inventory management system 210 may use the inventory data 212 to perform various inventory-related operations. For example, the inventory management system 210 may be implemented as a service on a computer system or as specialized computing hardware configured to access, process, and output inventory data 212. The inventory management system 210 may be configured to plan for inventorying items, tracking which items may be in-stock, which items may be out-of-stock, ordering and planning to inventory additional units of items, and performing other inventory-related operations.

A database or some other storage type may store the inventory data 212. The inventory data 212 may represent data related to the inventory 120. For example, the inventory data 212 may include historical and/or estimated data related to offered, ordered, purchased, and/or returned items. Some of the data may be stored in the database based on transactions associated with users (e.g., the service provider 110, the suppliers 130, the customers 140, or other operators). For example, the inventory data 212 may include historical demand realizations of items. A historical demand realization of an item may represent a set of observed values indicating the actual demand for the item over a period of time (e.g., the number of units sold, the number of users who requested information about the item, and/or other metrics to measure a demand value). Similarly, the inventory data 212 may include historical lead time realizations of items. A historical lead time realization of an item may represent a set of observed values indicating the actual lead time for the item. Other data may be stored in the database based on an analysis of the already-stored data. For example distribution functions, discrete statistics (e.g., averages, variances, ranges) may be generated from the historical data and stored as a part of the inventory data 212.

The quantity computing module 214 may be configured to access and analyze the inventory data 212 to compute quantities for items for inventorying purposes. For example, the quantity computing module 214 may implement a regret model for analyzing the inventory data 212. An example regret model, including a minimax regret model, is further illustrated in FIG. 3. Generally, the regret model may generate an optimal quantity of an item by reducing regret (e.g., profit decrease) based on selecting that optimal quantity as the quantity to inventory. In an example, the regret model may use the statistics about the demand and lead time variables, rather than the distribution functions, to select the optimal quantity, thereby implementing robustness around the two variables.

The quantities computed by the quantity computing module 214 may be used by the inventory management system 210 to generate an inventory plan. In an example, the inventory management system 210 may integrate, interface with, or subscribe to services of the quantity computing module 214. Further, one or each of the components may provide interfaces to allow users access to provided services. The interfaces may include web interfaces and/or application programming interfaces (APIs). A service of the inventory management system 210 may include providing the inventory plan and/or allowing inputs and outputs related to the inventory 120. A service of the quantity computing module 214 may include providing some or all of the computed quantities.

In an embodiment, operators of the inventory 120 may operate various computing systems to interface with the inventory management system 210 and/or the quantity computing module 214. The operators of the inventory 120 may be the same or a different entity than the service provider 110. In an example, some or all of the operators may represent automated processes and computing services. In particular, the operators may provide information about group levels 220, item categories 222, and items 224. An item category may represent a collection of items that may share at least one common feature. For example, digital single-lens reflex (DSLR) cameras from different manufacturers may belong to a same item category of DSLR cameras. A group level may represent a group of item categories that may share at least one common feature. For example, a DSLR camera category and a digital compact camera category may belong to a same group of digital cameras. The hierarchy between items, item categories, and group levels may be repeated at multiple levels.

The provided information may include, for example, an identifier of a group level, identifiers of item categories within that group level, identifiers of items within one category, and/or quantities of stored items. This information may also include observed values for various variables and constraints per group level, item category, and/or item. For example, the information may include observed demands, observed lead times, and other variable-related information.

The suppliers 130, illustrated as suppliers 230A-N, may likewise operate computing systems to interface with the inventory management system 210. As explained herein above, the interface may be facilitated via web interfaces and/or APIs such that the suppliers may subscribe to services of the inventory management system 210 and/or the quantity computing module 214. Each of the suppliers 230A-N may provide items of a same item category or of different item categories. Further, each of the suppliers 230A-N may be associated with a supplier lead time and a supplier offer. A supplier lead time may represent a lead time for a supplier to provide (e.g., manufacture and deliver) quantities of an item. A supplier offer may represent an offer for an item including, for example, a price, a promotion, a markdown, and/or a price match option. The supplier offer may impact the demand of the item. By interfacing with the inventory management system 210, the suppliers 230A-N may input information associated the various items including the supplier lead times and offers. In turn, this information can be stored as part of the inventory data 212.

Hence, by implementing the quantity computing module 214, the service provider 110 may access quantities of items to be inventoried. Further, by using these quantities in the inventory management system 210, the service provider 110 may automate the generation of the inventory plans. Further, because the quantities may be more optimal than those computed using distribution functions, the quality of the inventory plans may be improved, thereby improving the overall operations of the inventory management system 210. By also providing interfaces to various operators and to the suppliers 130, operations of the underlying systems of these users may be similarly improved.

Figure 3:
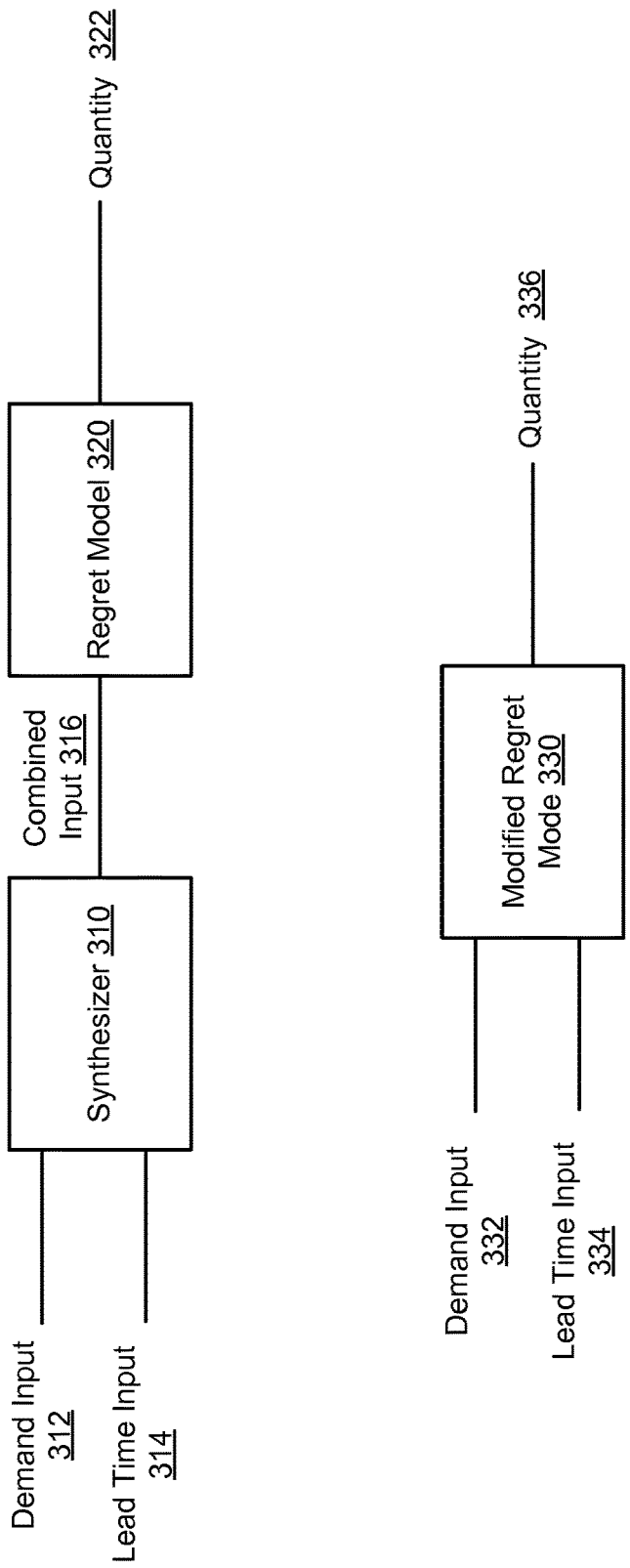
FIG. 3 illustrates example models configured to determine quantities associated with inventorying items, according to embodiments.

Turning to FIG. 3, the figure illustrates example regret models that may be implemented by a quantity computing module, such as the quantity computing module 214 of FIG. 2. Generally, a regret model may be configured to output an optimal quantity based on multiple variables, including demand and lead time variables. Rather than using distribution functions, the regret model may use statistics (e.g., averages and variances) about realizations of the variables. Further, the regret model may select a quantity from a plurality of quantities that may optimize an optimization parameter based on the statistics and may set this quantity as the optimal quantity. For example, the optimization parameter may include profit. Optimizing the profit may include reducing a decrease in the profit to fall below a threshold (e g, minimizing this decrease). In this case, the optimal quantity may represent a quantity resulting in an acceptable decrease (e.g., the minimal profit decrease).

In other words, because the true distribution of a variable may not be known, a decision to inventory a quantity may be made absent knowledge of the true distribution. A profit may be estimated based on that quantity. The regret model may estimate the regret resulting from making that decision. This regret may be relative to what the decision would have been had the true distribution been known. However, because the true profit from the true distribution may not be known, the regret model may in practicality use the worst-case scenario regret (e.g., the maximal regret). The regret model may iteratively estimate different regrets by selecting different quantities relative to the worst-case scenario regret. The optimal quantity may then represent the quantity that may result in the smallest regret.

To illustrate, consider the following example. Assume that sets of demand and lead time vary between two ranges (denoted as "$D_i$" and "$l_i$" in the table below, where "i" varies between ranges "A" and "B"). Assume also that potential quantities also vary between two ranges (denoted as "$Q_j$" in the table below, where "j" varies between ranges "C" and "D"). For each of the potential quantities and corresponding set of demand and lead times, the regret model may compute a profit (denoted as "$P_{i,i}(j)$" in the table below). Assume also that a maximal profit may be computed given each set of demand and lead time. For instance, the maximal profit may be computed using an optimization method such as one utilizing an objective function.

| | $Q_C$ | $Q_D$ | Maximal Profit |
|---|---|---|---|
| $D_A, l_A$ | $P_{A,A}(C) = \$3$ | $P_{A,A}(D) = \$5$ | $\text{Max}(P_{A,A}) = \$6$ |
| $D_B, l_B$ | $P_{B,B}(C) = \$3$ | $P_{B,B}(D) = \$2$ | $\text{Max}(P_{B,B}) = \$9$ |
| $D_A, l_B$ | $P_{A,B}(C) = \$7$ | $P_{A,B}(D) = \$3$ | $\text{Max}(P_{A,B}) = \$8$ |
| $D_B, l_A$ | $P_{B,A}(C) = \$4$ | $P_{B,A}(D) = \$5$ | $\text{Max}(P_{B,A}) = \$5$ |

For each of the quantities, the regret model may then compute a maximal decrease in profit by subtracting the corresponding profit from the maximal profit. The next table may reflect this analysis, where "regret" may represent the decrease in profit.

|        | $Q_C$         | $Q_D$         |
| ------ | ------------- | ------------- |
| $D_A,l_A$ | Regret = $3  | Regret = $1  |
| $D_B,l_B$ | Regret = $6  | Regret = $7  |
| $D_A,l_B$ | Regret = $1  | Regret = $5  |
| $D_B,l_A$ | Regret = $1  | Regret = $0  |

Thereafter, the regret model may determine the maximal regret for each quantity. Thus, $\text{Regret}_{max}(C)=\max(3, 6, 1, 1)=\$6$. $\text{Regret}_{max}(D)=\max(1, 7, 5, 0)=\$7$. Based on this computation, the regret model may select the smallest of the maximal regrets because this selected regret may represent the minimal worst-case. The quantity corresponding to the selected maximal regret (e.g., quantity "$Q_C$") may represent the optimal quantity by being the quantity that may result in the minimal worst-case regret.

As a further illustration, consider the next example. Assume that an average of six days (or some other number) for the lead time is given. Thus, the lead time may be distributed as either:

$$L = \begin{cases} 4, & p = 0.5 \\ 8, & p = 0.5 \end{cases}$$

Or $$\hat{L} = \begin{cases} 3, & p = 0.5 \\ 9, & p = 0.5 \end{cases}$$

Similarly, assume that an average of forty units (or some other number) for the demand is given. Thus, the demand may be distributed as either:

D is uniformly distributed between 30 and 50 (e.g., any number may equally be likely) Or
$\hat{D}$ is uniformly distributed between 20 and 60 (e.g., any number may equally be likely).

Under each combination of demand and lead time, an optimum profit (e.g., maximum profit) may be computed using an optimization algorithm (e.g., an objective function). When computing the optimum profit (shown as "Profit*" in the tables below), the optimization algorithm may find a quantity (shown as "Q*" in the tables below) that would result in the optimum profit. The regret model may compute the maximal regret for various potential quantities (shown as "Q" in the tables below). In this example, assume that the regret model computes the maximal regret for Q={10, 9}. To do so, the regret model may compute the profit (shown as "Profit" in the tables below) given each quantity-lead time combination and may compare that profit to the optimum profit. The results of these computations are illustrated in the next two tables.

| Q = 10 | L | $\hat{L}$ |
| --- | --- | --- |
| D | Q* = 10<br>Profit*(10\L,D) = 20<br>Profit (10\L,D) = 20<br>regret(10) = 0 | Q* = 8<br>Profit*(8\$\hat{L}$,D) = 30<br>Profit(10\$\hat{L}$,D) = 26<br>Regret(10) = 30 − 26 = 4 |
| $\hat{D}$ | Q* = 7<br>Profit*(7\L,$\hat{D}$) = 25<br>Profit(10\L,$\hat{D}$) = 20<br>Regret(10) = 25 − 20 = 5 | Q* = 11<br>Profit*(11\$\hat{L}$,$\hat{D}$) = 22<br>Profit(101$\hat{L}$,$\hat{D}$) = 13<br>Regret(10) = 22 − 13 = 9 |

Here, the maximum regret for the quantity "Q" equal ten may be found as $\max(0, 5, 4, 9)=9$. A similar computation may be performed for the quantity "Q" equals nine as shown in the next table.

| Q = 9 | L | $\hat{L}$ |
| --- | --- | --- |
| D | Q* = 10<br>Profit*(10\L,D) = 20<br>Profit(9\L,D) = 19<br>regret(10) = 20 − 19 = 1 | Q* = 8<br>Profit*(8\$\hat{L}$,D) = 30<br>Profit(9\$\hat{L}$,D) = 25<br>Regret(10) = 30 − 25 = 5 |
| $\hat{D}$ | Q* = 7<br>Profit*(7\L,$\hat{D}$) = 25<br>Profit(9\L,$\hat{D}$) = 23<br>Regret(10) = 25 − 23 = 2 | Q* = 11<br>Profit*(11\$\hat{L}$,$\hat{D}$) = 22<br>Profit(9\$\hat{L}$,$\hat{D}$) = 18<br>Regret(10) = 22 − 18 = 4 |

Here, the maximum regret for the quantity "Q" equal nine may be found as $\max(1, 2, 5, 4)=5$. In this case, because the maximal regret for selecting nine units (e.g., Q=9) is the smaller of the two, that quantity may be set as the optimal quantity.

The above examples are provided for illustrative purposes. A larger number of quantities and sets of demand/lead time may be considered. In addition, the sets may include other data associated with distributions of the demand and/or lead time variables.

Generally, the regret model may be configured to search for an optimal quantity based on statistics about multiple variables. Various approaches may be implemented to consider the multiple variables. As illustrated in FIG. 3, a first approach may use a single input to the regret model. Under this approach, the statistics about the two variables may be combined to generate the single input. This approach may be referred to as a synthetic input approach. As further illustrated in FIG. 3, another approach may use two inputs to the regret model. Each of the inputs may correspond to one of the two variables. Under this approach, an expectation function may be used for one or both of the variables. This approach may be referred to as an expectation function approach.

Each of the two approaches is further described in the next paragraphs. However, a one dimensional regret model is described first. In the interest of clarity of explanation, the one dimensional regret model is described in connection with the demand variable. Nonetheless, the one dimensional regret model may be similarly applied to any other variable. The two approaches may expand this one dimensional regret model to include other variables, such as the lead time variable. The expansion is described in the paragraphs following the description of the one dimensional regret model.

In the description of the one dimensional regret model, the following notations may be used. "c" may represent a purchase cost per unit. "p" may represent a selling price per unit. "s" may represent a salvage value per unit. "l" may represent a penalty cost for lost sale per unit per time period. "h" may represent holding cost per unit per time period. "D" may represent demand per time period. "Q" may represent a quantity to be inventoried.

In an example, the one dimensional regret model may implement a one dimensional minimax regret model. The one dimensional minimax regret model may take the range, mean and/or variance of a forecast of the demand variable. The forecast may be generated from historical data as input data. The one dimensional minimax regret model may explore all demand distributions with such properties (e.g., in the example table above, "$D_1,l_1$" may be substituted for demand distributions to find different profits), and seek an optimal solution that may minimize the maximal regret. Mathematically, this minimax regret problem may be formulated as:

$$\min_{y \geq 0} \max_{F \in \mathcal{F}} \left[ \max_{z \geq 0} \pi_F(z) - \pi_F(y) \right]. \quad (1)$$

"y" may represent the decision variable, "z" may represent all the possible decisions that may be made, and "$\mathcal{F}$" may include all the distributions being considered. Further, $\pi_F(y)$ may represent a profit. The profit may be computed based on an objective function that may account for the different distributions and other parameters.

Given a decision "y," the inner maximization problem $\max_{z \geq 0} \pi_F(z) - \pi_F(y)$ may give the additional profit that may have been obtained if the correct decision "z*" was made under distribution "$\mathcal{F}$." Since the true distribution may not be known, the maximal regret over all the possible distributions in "$\mathcal{F}$" may be chosen. This maximal regret may be represented as $$\max_{F \in \mathcal{F}} \left[ \max_{z \geq 0} \pi_F(z) - \pi_F(y) \right].$$

Finally, the ultimate goal may be to find "y*" that may minimize this maximal regret measure over all the distributions.

Further, assume $$\beta = \frac{c+h-s}{p+1+h-z}, \quad 1-\beta$$

may represent a critical ratio. Given mean $$\mu, y^* = \begin{cases} \mu(1-\beta) & \text{if } \beta \geq \frac{1}{2} \\ \mu/4\beta & \text{if } \beta < \frac{1}{2} \end{cases}, .$$

Given mean $\mu$ and variance $\sigma^2$, y* may be the optimal solution to the following equality:

$$\max\left\{\max_{x \in S_1}(\mu/x - \beta)(x-y), \max_{x \in S_2}\left[\frac{\sigma^2}{\sigma^2+(x-\mu)^2} - \beta\right](x-y)\right\} = \quad (2)$$

$$\max_{x \in S_3}\left[\frac{(x-\mu)^2}{\sigma^2+(x-\mu)^2} - \beta\right](x-y),$$

where $$S_1 = \left\{ x \,\middle|\, \max\{u, y\} \leq x \leq \frac{\sigma^2 + \mu^2}{\mu} \right\},$$

$$S_2 = \left\{ x \,\middle|\, \max\left\{y, \frac{\sigma^2+\mu^2}{\mu}\right\} \leq x \leq y + (\sigma^2+(\mu-y)^2)^{1/2} \right\},$$

and $$S_3 = \{x \mid \min\{\mu, y\} \geq x \geq \max\{0, y-(\sigma^2+(\mu-y)^2)^{1/2}\}\}.$$

Turning to how the above one-dimensional regret model may be expanded in more detail, the synthetic approach may use synthesizer 310 and a regret model 320. The regret model 320 may implement the above one-dimensional regret model. The synthesizer 310 may interface or integrate with the regret model 320. The synthesizer 310 may be configured to combine an input 312 associated with the demand variable and an input 314 associated with the lead time variable to generate a combined input 316. The inputs 312 and 314 may include statistics (e.g., means and variances) about the variables. The combined input 316 may include combined statistics about the variables.

In particular, means and variances may be used in equations (1) and (2). As such, the combined input 316 may include means and variances synthesized from the inputs 312 and 314. Various approaches may be used to synthesize such means and variances.

In an example approach, the lead time input 314 may be incorporated by modifying the demand input 312 (or vice versa). In this approach, the demand input 312 may include the means and variances of the demand distributions considered in "$\mathcal{F}$." More particularly, multiple potential lead times may be considered. Each lead time "$l_i$" may have a probability "$p_i$" generated based on historical realizations of the lead time variable. The lead time input 314 may include these probabilities. Because the variability of the lead time may impact the variability of the demand, the probabilities may be used to modify the means and variances of the demand input 312. In other words, the combined input 316 may be expressed as Mean=f(demand mean, $p_i$) and Variance=f(demand mean, variance mean, $p_i$), where f(·) may be a linear function. This combined input 316 may then be used in equations (1) and/or (2) to find an optimal quantity 322.

To illustrate, consider an example of two lead times with two probabilities: $\{l_1, p_1\}$ and $\{l_2, p_2\}$. Assume that the forecasted demand means and variances under these two lead times may be $\{\mu_1, \sigma_1^2\}$ and $\{\mu_2, \sigma_2^2\}$. The combined input 316 may be expressed as Mean=$\mu_1 p_1 + \mu_2 p_2$ and Variance=$\sigma_1^2 p_1 + \sigma_2^2 p_2 + \mu_1^2 p_1 + \mu_2^2 p_2 - (\mu_1 p_1 + \mu_2 p_2)^2$. In this example, "$\mathcal{F}$" would represent a set of all distributions having such mean and variance. Equation (1) may be used with the mean and variance of the combined input 316 to find the optimal quantity 322.

In comparison, under the expectation function approach, the two inputs may not be combined. Instead, a modified regret model 330 may be used. The modified regret model 330 may modify the equations of the one-dimensional regret model to use an expectation function, such as an averaging function, in association with one or both of the inputs.

In an example, the forecast of a lead time may be assumed to be of an acceptable quality (additionally or alternatively, a similar assumption may be made for the demand based on the corresponding quality). In this example, a demand input 332 and a lead time input 334 including statistics about the demand and the lead time, respectively, may be provided to the modified regret model 330. In turn, the modified regret model 330 may output an optimal quantity 336 by applying an expectation function to the lead time input 334. By applying the expectation function, expectations over different realizations of the lead time may be generated. Thus, under this approach, rather than not considering the lead time or rather than applying too much robustness by setting the lead time to a constant, different expectations of the lead time realizations may be considered and analyzed. As described herein above, that may be possible when the lead time forecast may be of an acceptable quality.

To do so, equation (1) may be modified and expressed as:

$$\min_{y\geq 0} E_l \max_{F\in\mathcal{F}_l} \left[\max_{z\geq 0} \pi_F(z) - \pi_F(y)\right]. \quad (3)$$

"$E_l$" may represent the expectations of the lead time. Because taking the expectations may preserve the concavity of the inner maximization problem, the optimal quantity 336 may be computed by solving equation (2) based on taking the expectations on both sides of the equation.

Under both approaches, the regret model may be configured to output an optimal quantity by considering variability of both the demand and the lead time. In contrast thereto, the one-dimensional regret model of equations (1) and (2) may consider only one of the two variables. Because the variability of the lead time may impact the variability of the demand, and vice versa, the optimal quantity computed based on the above expansions of the one-dimensional regret model may have an improved optimality.

Figure 4:
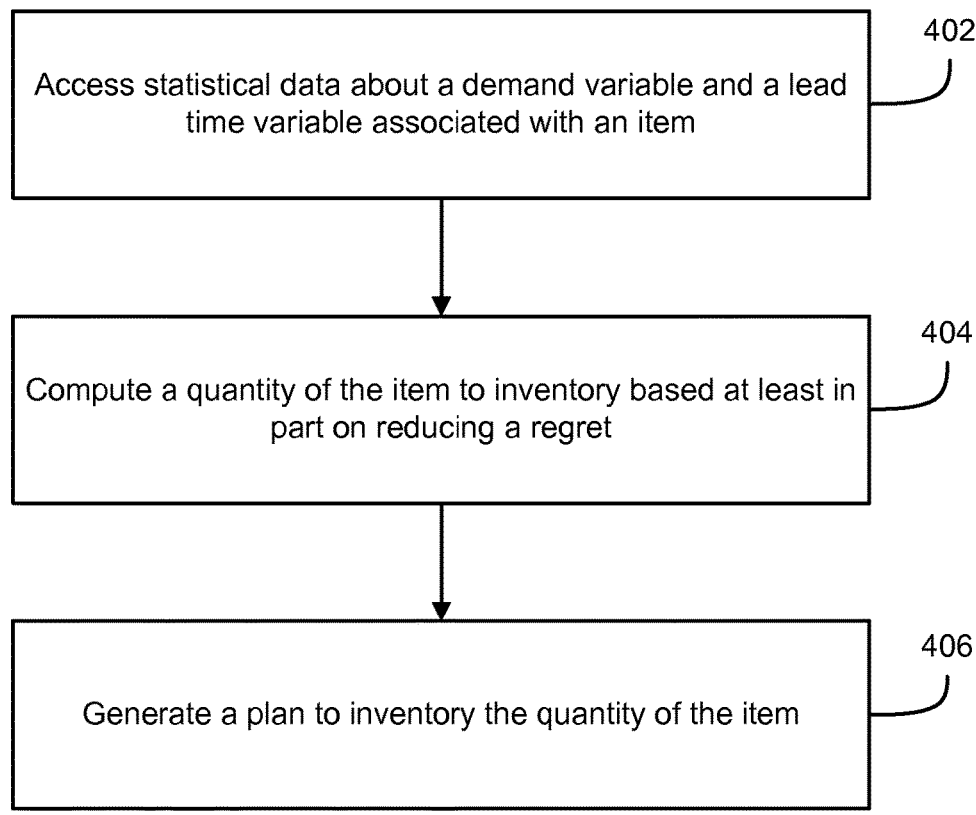
FIG. 4 illustrates an example flow for determining a quantity of an item to inventory, according to embodiments.
Figure 5:
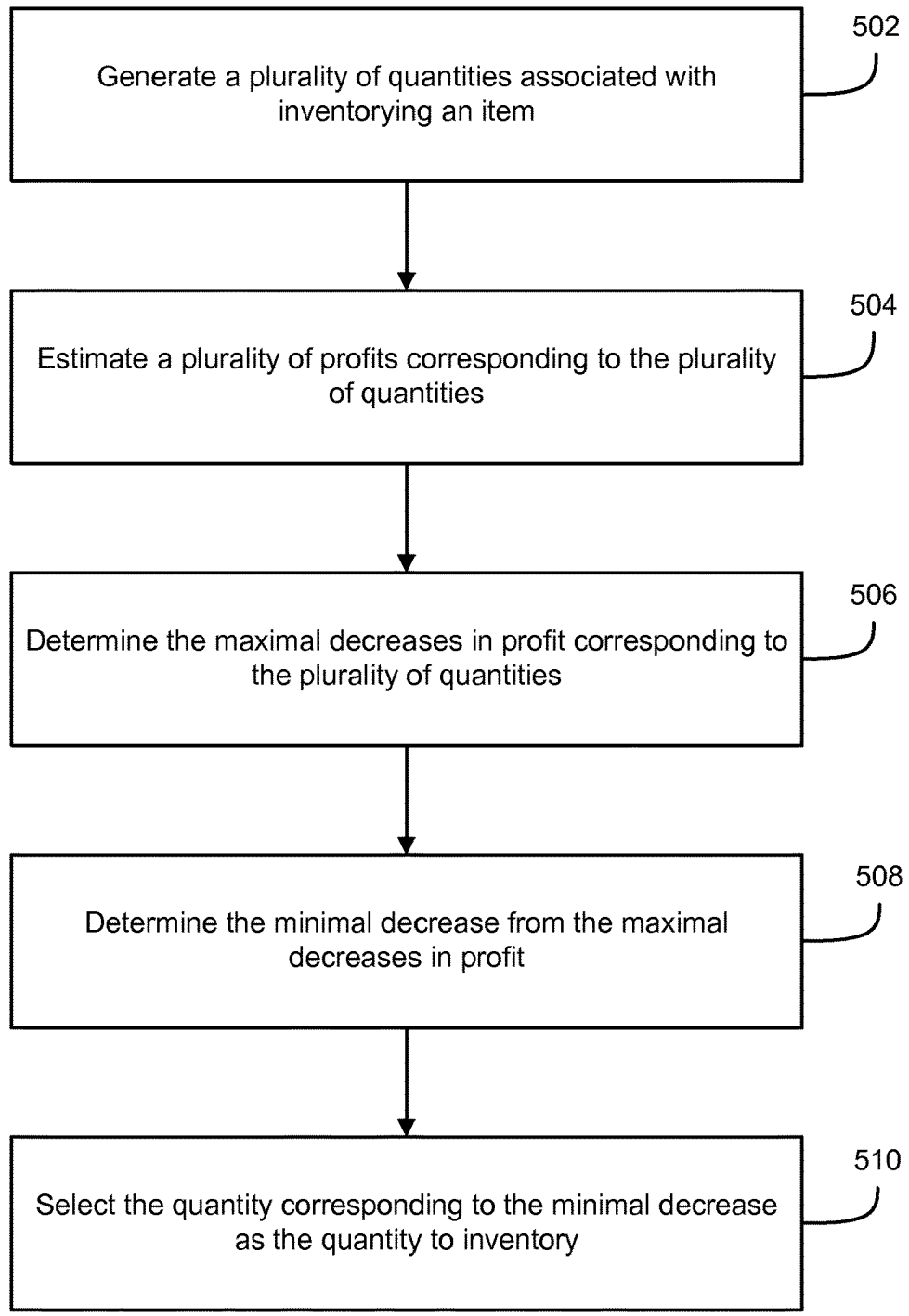
FIG. 5 illustrates an example flow for determining a quantity of an item to inventory based on a regret model, according to embodiments.

Turning to FIGS. 4-5, the figures illustrate example flows related to generating an inventory decision that may include an optimal quantity of an item. In particular, FIG. 4 illustrates an example flow for generating the inventory decision. In comparison, FIG. 5 illustrates an example flow for determining the optimal quantity. Some operations across the example flows may be similar. Such similarities are not repeated herein in the interest of clarity of explanation.

In the illustrative operations, some of the operations or functions may be embodied in, and fully or partially automated by, modules executed by one or more processors. For example, a quantity computing module hosted on a computing resource of a service provider (e.g., the quantity computing module 214 of FIG. 2) may be configured to perform some of the operations. Nevertheless, other, or a combination of other, computing resources, systems, and/or modules, such as an inventory management system, may be additionally or alternatively used. Also, while the operations are illustrated in a particular order, it should be understood that no particular order is necessary and that one or more operations may be omitted, skipped, and/or reordered.

In the interest of clarity of explanation, the example flows of FIGS. 4-5 illustrate the inventory decision as associated with a single item. Nevertheless, the embodiments described herein are not limited as such. Instead, the example flows may similarly apply to an inventory decision associated with multiple items.

The example flow of FIG. 4 may start at operation 402, where statistical data about a demand variable and a lead time variable associated with an item may be accessed. The statistical data may be accessed from a data store, such as the data store storing the inventory data 212 of FIG. 2. Further, the statistical data may include averages and variances generated from forecasts associated with the two variables. Generally, a forecast for a variable of an item may be generated based on different types of data. For example, the forecast may be generated from historical realizations of the variable. In another example, the forecast may be generated based on data representing user input (e.g., an expert user input). In yet another example, the forecast may be generated from data (e.g., historical realizations, user input data) associated with another item. The other item may be a similar item (e.g., the two items having a set of common features or belonging to the same item category).

At operation 404, a quantity may be computed based on reducing a regret. The quantity may represent an optimal quantity of the item to inventory. A regret model may be implemented to compute this quantity. In particular, the regret model may analyze a plurality of quantities, estimate the corresponding profits (or some other optimization parameters) given the statistical data, choose the quantity having an acceptable regret (e.g., the minimal regret), and set this quantity as the optimal quantity.

In an example, the regret model may be configured to apply a synthetic input approach as described in FIG. 3. In another example, the regret model may be configured to apply an expectation function approach as described in FIG. 3. In yet another example, the regret model may be configured to select between the two approaches and apply only the selected approach. The selection may be based on a number of parameters. For instance, the selection may be based on the item or the category of the item. In particular, profits for different items and item categories may be computed in a testing environment using both approaches. For each item or item category, an indication of which approach may result in the higher profit may be maintained. As such, based on the maintained indication for the item (or the corresponding category), the regret model may select and apply the indicated approach.

At operation 406, a plan to inventory the quantity of the item may be generated. This plan may include the inventory decision, which in turn may set the quantity as the optimal quantity. The plan may be usable to different systems, such as an inventory management system of a service provider and/or of a supplier to plan for inventorying the quantity of the item during a planning horizon.

Turning to FIG. 5, the figure illustrates an example flow for generating the optimal quantity. In particular, the quantity computing module may implement the regret model to select this quantity from a plurality of quantities. The selection may be based on optimizing a regret (e.g., minimizing the maximum profit decrease) given different statistical data about the demand and lead time variables.

The example flow of FIG. 5 may start at operation 502, where a plurality of quantities associated with inventorying an item may be generated. Each of these quantities may represent a potential quantity that may be used during a planning horizon. The quantities may collectively represent a range. On the lower bound, the range may be limited by the existing inventory level of the item. On the upper bound, the range may be limited by the maximum quantity that may be inventoried given different constraints, such as capacity and labor constraints. An optimal quantity may correspond to one point in the range (which would be unknown until searched through a regret model). Lower quantities in the range may result in under-buying and profit loss. Likewise, higher quantities in the range may also result in over-buying and profit loss. Data about the range may be available from the inventory data 212 of FIG. 2. This data may be used to generate the plurality of quantities. In an example, all of the potential quantities may be considered and analyzed. In another example, some but not all of the potential quantities may be analyzed to reduce the computation. In this example, a line search, a binary search, or other search algorithms may be implemented to select the potential quantities to be analyzed.

At operation 504, a plurality of profits corresponding to the plurality of quantities may be estimated. For example, for each of the quantities, a corresponding profit may be computed for a planning horizon. A profit may be computed using various techniques. In one example technique, the profit may be a function of cost and revenue per unit of the item. In another example technique, distribution functions about demand, lead time, and other variables, cost associated with constraints, and other parameters may be used. In this example, an objective function may be implemented to search for an optimal profit given these different variables.

At operation 506, maximal decreases in profit may be determined. Each maximal decrease may correspond to one of the quantities. This determination may represent a search for a maximal regret, where the regret may include the profit decrease. As such, a regret model may be implemented to compute the maximal decreases. In an example, the regret model may use statistical data about the demand and lead time variables as input to look for the maximal profit decrease for each of the quantities.

At operation 508, the minimal decrease from the maximal decreases in profit may be determined. For example, the different maximal profit decreases may be compared to determine which one may correspond to the minimal decrease.

At operation 510, the quantity corresponding to the minimal decrease may be selected. This quantity may represent the optimal quantity. In particular, this quantity may minimize the maximal decrease in profit (e.g., minimize the maximal regret). Further, the quantity may be used in an inventory decision to inventory the item.

Figure 6:
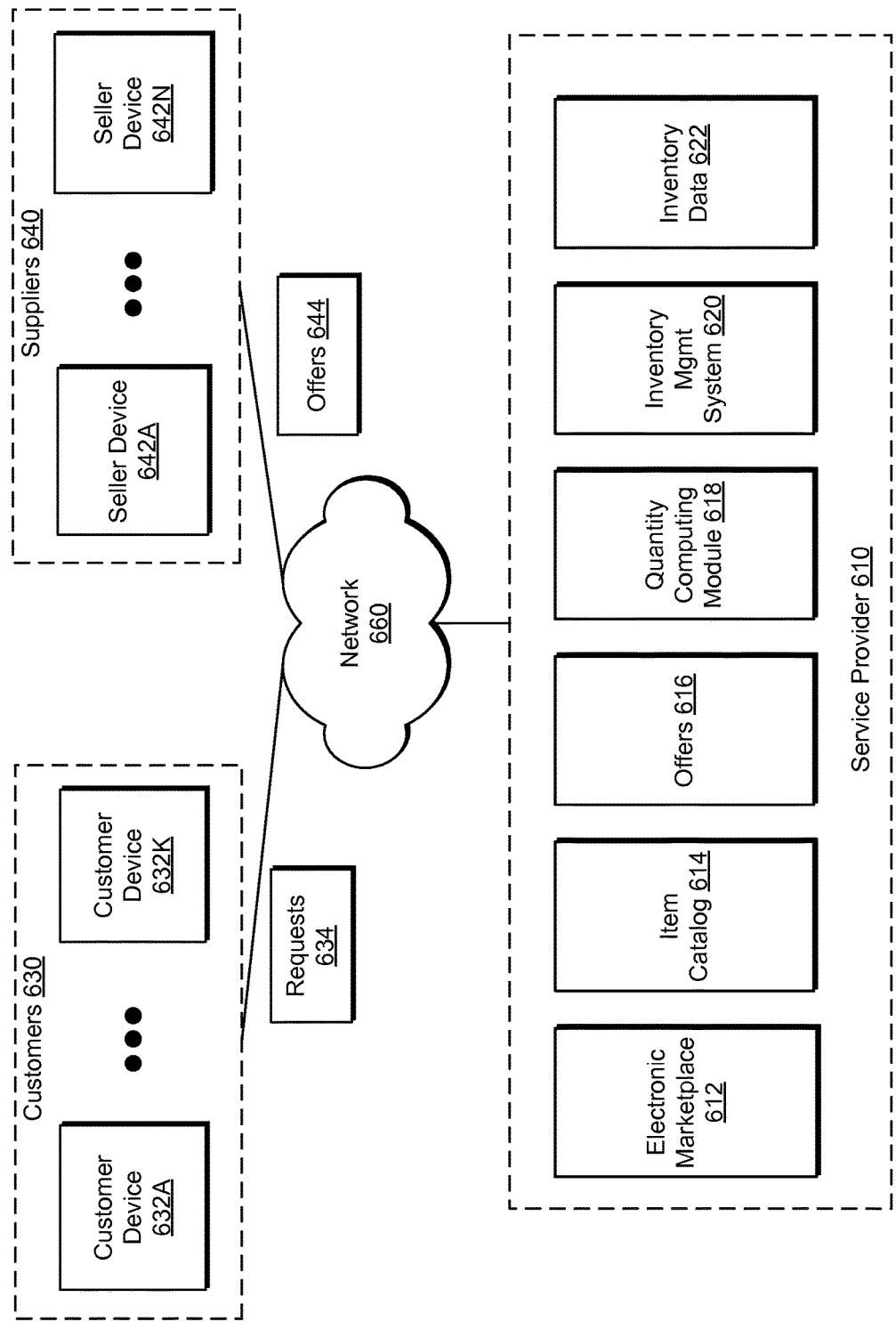
FIG. 6 illustrates an example computing environment associated with an electronic marketplace, according to embodiments.

A quantity computing module, such as the quantity computing module 214 of FIG. 2, may be implemented within a context of an electronic marketplace. FIG. 6 illustrates an example computing environment for implementing such a module in the context of an electronic marketplace. In particular, a service provider 610 of an electronic marketplace 612 may implement a quantity computing module 618 on a service provider computing resource to generate S&OP forecasts associated with inventorying purposes.

The electronic marketplace 612 may offer different items. Offered items may be cataloged in an item catalog 614. In addition, the offered items may be ordered from the electronic marketplace 612 according to offers 616. The offers 616 may use data from the item catalog 614 to describe some of the item attributes and offer attributes.

A network-based document (e.g., a web page) of the electronic marketplace 612 may be associated with an item. For example, the network-based resource document may allow suppliers 640 and/or the service provider 610 to provide information for ordering an item. This may include the suppliers listing offers 644 at the electronic marketplace 612. The network-based document may also allow customers 630 to review this information and make an order or purchase decision. The customers 630 may, for example submit requests 634 for offers. In an example, the network-based resource document may present information from the item catalog 614 for the offers 616.

The quantity computing module 618 may be configured to generate an inventory decision. The inventory decision may include an optimal quantity. In an example, the quantity computing module may implement a regret model that may use one or both of the synthetic input or the expectation function approaches to generate the optimal quantity. Further, the quantity computing module 618 may interface or integrate with an inventory management system 620 to manage an inventory of the electronic marketplace 612. Data about managing the inventory may be stored as inventory data 622 in a data store of the electronic marketplace 612.

As such, the service provider 610 may operate the electronic marketplace 612 to facilitate interactions between the service provider 610, the customers 630, and the suppliers 640 over a network 660. Each one of the suppliers 640 may operate one or more supplier devices 642A-N to access the electronic marketplace 612 and perform various supplier-related transactions. A customer may be an item recipient, a buyer, or any user reviewing, browsing, ordering, obtaining, purchasing, or returning an item of a supplier. Each one of the customers 630 may operate one or more customer devices 632A-K to access the electronic marketplace 612 and perform various customer-related transactions. By implementing the quantity computing module 618 and the inventory management system 620, the service provider 610 may use optimal quantities for purposes of inventorying items. The optimal quantities may be derived when distribution functions associated with the items may be untrusted.

Figure 7:
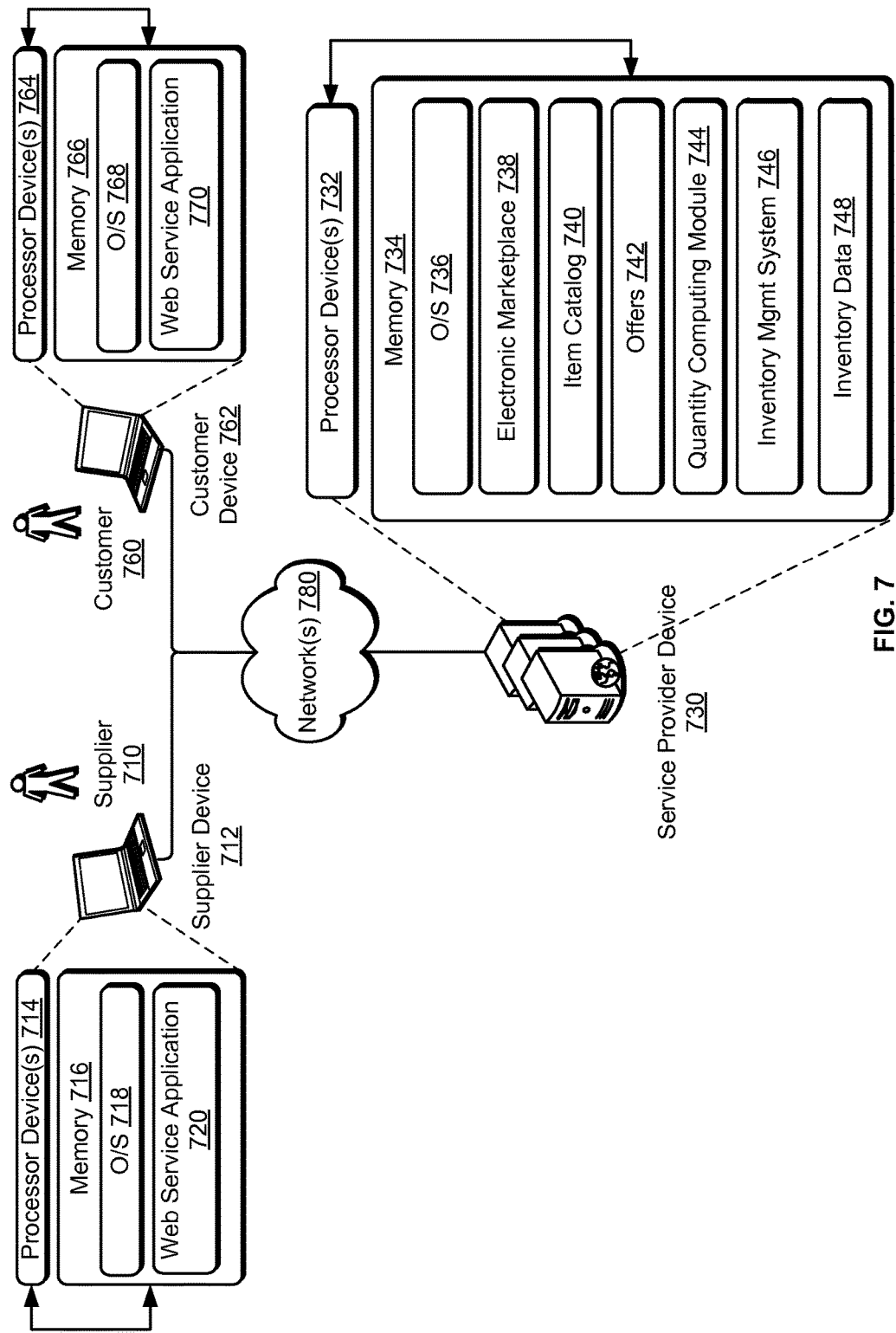
FIG. 7 illustrates an example architecture for providing a network-based resource, including at least one user device and/or one or more service provider devices connected via one or more networks, according to embodiments.

Turning to FIG. 7, that figure illustrates an example end-to-end computing environment for implementing a forecast module. In this example, a service provider may implement a quantity computing module, such as the quantity computing module 618 of FIG. 6, within the context of, for example, an electronic marketplace available to users, such as to the customers 630 and the suppliers 640 of FIG. 6.

In a basic configuration, a supplier 710 may utilize a supplier device 712 to access local applications, a web service application 720, a supplier account accessible through the web service application 720, a web site or any other network-based resources via one or more networks 780. In some aspects, the web service application 720, the web site, and/or the supplier account may be hosted, managed, and/or otherwise provided by one or more computing resources of the service provider, such as by utilizing one or more service provider devices 730. The supplier 710 may use the local applications and/or the web service application 720 to interact with the network-based resources of the service provider and perform supplier-related transactions. These transactions may include, for example, offering items for sale and/or providing information about supplier-related variables and constraints.

In some examples, the supplier device 712 may be any type of computing devices such as, but not limited to, a mobile phone, a smart phone, a personal digital assistant (PDA), a laptop computer, a thin-client device, a tablet PC, etc. In one illustrative configuration, the supplier device 712 may contain communications connection(s) that allow the supplier device 712 to communicate with a stored database, another computing device or server, supplier terminals, and/or other devices on the networks 780. The supplier device 712 may also include input/output (I/O) device(s) and/or ports, such as for enabling a connection with a keyboard, a mouse, a pen, a voice input device, a touch input device, a display, speakers, a printer, etc.

The supplier device 712 may also include at least one or more processing units (or processor device(s)) 714 and one memory 716. The processor device(s) 714 may be implemented as appropriate in hardware, computer-executable instructions, firmware, or combinations thereof. Computer-executable instructions or firmware implementations of the processor device(s) 714 may include computer-executable or machine-executable instructions written in any suitable programming language to perform the various functions described.

The memory 716 may store program instructions that are loadable and executable on the processor device(s) 714, as well as data generated during the execution of these programs. Depending on the configuration and type of supplier device 712, the memory 716 may be volatile (such as random access memory (RAM)) and/or non-volatile (such as read-only memory (ROM), flash memory, etc.). The supplier device 712 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 716 may include multiple different types of memory, such as static random access memory (SRAM), dynamic random access memory (DRAM), or ROM.

Turning to the contents of the memory 716 in more detail, the memory may include an operating system (O/S) 718 and the one or more application programs or services for implementing the features disclosed herein including the web service application 720. In some examples, the supplier device 712 may be in communication with the service provider devices 730 via the networks 780, or via other network connections. The networks 780 may include any one or a combination of many different types of networks, such as cable networks, the Internet, wireless networks, cellular networks, and other private and/or public networks. While the illustrated example represents the supplier 710 accessing the web service application 720 over the networks 780, the described techniques may equally apply in instances where the supplier 710 interacts with the service provider devices 730 via the supplier device 712 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 760 may utilize customer device 762 to access local applications, a web service application 770, a customer account accessible through the web service application 770, a web site, or any other network-based resources via the networks 780. In some aspects, the web service application 770, the web site, and/or the user account may be hosted, managed, and/or otherwise provided by the service provider devices 730 and may be similar to the web service application 720, the web site accessed by the computing device 712, and/or the supplier account, respectively.

The customer 760 may use the local applications and/or the web service application 770 to conduct transactions with the network-based resources of the service provider. These transactions may include, for example, searching for items offered by the supplier 710 at the network-based resources, receiving offers for the items, ordering items, returning items, and other transactions.

In some examples, the customer device 762 may be configured similarly to the supplier device 712 and may include at least one or more processing units (or processor device(s)) 764 and one memory 766. The processor device(s) 764 may be implemented as appropriate in hardware, computer-executable instructions, firmware, or combinations thereof similarly to the processor device(s) 714. Likewise, the memory 766 may also be configured similarly to the memory 716 and may store program instructions that are loadable and executable on the processor device(s) 764, as well as data generated during the execution of these programs. For example, the memory 766 may include an operating system (O/S) 768 and the one or more application programs or services for implementing the features disclosed herein including the web service application 770.

As described briefly above, the web service applications 720 and 770 may allow the supplier 710 and customer 760, respectively, to interact with the service provider devices 730 to conduct transactions involving items. The service provider devices 730, perhaps arranged in a cluster of servers or as a server farm, may host the web service applications 720 and 770. These servers may be configured to host a web site (or combination of web sites) viewable via the computing devices 712 and 762. Other server architectures may also be used to host the web service applications 720 and 770. The web service applications 720 and 770 may be capable of handling requests from many suppliers 710 and customers 760, respectively, and serving, in response, various interfaces that may be rendered at the computing devices 712 and 762 such as, but not limited to, a web site. The web service applications 720 and 770 may interact with any type of web site that supports interaction, including social networking sites, electronic retailers, informational sites, blog sites, search engine sites, news and entertainment sites, and so forth. As discussed above, the described techniques may similarly be implemented outside of the web service applications 720 and 770, such as with other applications running on the computing devices 712 and 762, respectively.

The service provider devices 730 may, in some examples, provide network-based resources such as, but not limited to, applications for purchase and/or download, web sites, web hosting, client entities, data storage, data access, management, virtualization, etc. The service provider devices 730 may also be operable to provide web hosting, computer application development, and/or implementation platforms, or combinations of the foregoing to the supplier 710 and customer 760.

The service provider devices 730 may be any type of computing device such as, but not limited to, a mobile phone, a smart phone, a personal digital assistant (PDA), a laptop computer, a desktop computer, a server computer, a thin-client device, a tablet PC, etc. The service provider devices 730 may also contain communications connection(s) that allow service provider devices 730 to communicate with a stored database, other computing devices or servers, supplier terminals, and/or other devices on the network 780. The service provider devices 730 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 730 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 730 may be in communication with the computing devices 712 and 762 via the networks 780, or via other network connections. The service provider devices 730 may include one or more servers, perhaps arranged in a cluster, or as individual servers not associated with one another.

In one illustrative configuration, the service provider devices 730 may include at least one or more processing units (or processor devices(s)) 732 and one memory 734. The processor device(s) 732 may be implemented as appropriate in hardware, computer-executable instructions, firmware, or combinations thereof. Computer-executable instruction or firmware implementations of the processor device(s) 732 may include computer-executable or machine-executable instructions written in any suitable programming language to perform the various functions described.

The memory 734 may store program instructions that are loadable and executable on the processor device(s) 732, as well as data generated during the execution of these programs. Depending on the configuration and type of the service provider devices 730, the memory 734 may be volatile (such as random access memory (RAM)) and/or non-volatile (such as read-only memory (ROM), flash memory, etc.). The service provider devices 730 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 734 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 734 in more detail, the memory may include an operating system (O/S) 736, code for an electronic marketplace 738, data related to an item catalog 740, data related to available offers 742, code for a quantity computing module 744, code for an inventory management system 746, and inventory data 748. Although FIG. 7 illustrates the various data as stored in the memory 734, this data or portion of the data may be additionally or alternatively stored at a storage device remotely accessible to the service provider devices 730.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing a database and comprising instructions that, when executed with one or more processors, cause a system to at least:
   execute code of a quantity computing module that implements a minimax regret model;
   execute code of a web-based service; and
   send inventory quantities to an inventory management system over a first application programming interface (API);

wherein the web-based service:
receives, from a supplier device over a second API, supplier data about an item available from a supplier, the supplier data comprising supplier lead-time data;
receives, from an inventory device over a third API, inventory level data about the item;
stores the supplier data and the inventory level data in the database;
provides a search engine to a user device;
receives a search about the item from the user device based at least in part on the search engine; and
sends, to the user device, a network-based document that includes a search result about the item from the database, the search result indicating an availability of the item based at least in part on an inventory plan;
wherein the quantity computing module:
generates, forecasts about realizations of at least two variables associated with the item based at least in part on the supplier lead-time data and the inventory level data;
generates statistical data about the at least two variables based at least in part on the forecasts;
determines a quantity of the item to inventory based at least in part on the minimax regret model, wherein the minimax regret model selects the quantity by at least generating a plurality of maximal regrets each corresponding to inventorying one of a plurality of quantities of the item, the plurality of maximal regrets generated by at least:
computing, for each one of the plurality of quantities and based at least in part on the statistical data, a realization of an optimization parameter and a maximal realization of the optimization parameter, and
computing, for each one of the plurality of quantities, a maximal regret based at least in part on the corresponding realization and maximal,
selecting a regret of the plurality of maximal regrets based at least in part on a determination that the regret is the minimal of the plurality of maximal regrets, and
determining the quantity corresponding to the selected regret; and
sends, to the inventory management system over the first API, the quantity, the quantity causing the inventory management system to update an inventory plan by at least replacing another quantity with the quantity, the inventory plan comprising an allocation of resources to inventory the quantity of the item based at least in part on the replacement.

2. The one or more non-transitory computer-readable media of claim 1, wherein the item is available for ordering from an electronic marketplace.

3. The one or more non-transitory computer-readable media of claim 1, wherein the at least two variables comprise at least two of: a demand variable, a lead time variable, a supply variable, a cost variable, or a capacity variable, and wherein the regret comprises at least one of: a profit decrease or a cost increase.

4. The one or more non-transitory computer-readable media of claim 1 wherein the statistical data comprises at least one of: averages, means, modes, medians, variances, or ranges of the forecasts associated with the at least two variables.

5. The one or more non-transitory computer-readable media of claim 1, wherein the regret is selected based at least in on a comparison of the plurality of maximal regrets.

6. The one or more non-transitory computer-readable media of claim 1, wherein the quantity of the item is computed based at least in part on the minimax regret model configured to determine the quantity of the item by at least minimizing a maximal regret based at least in part on the statistical data about the at least two variables.

7. The one or more non-transitory computer-readable media of claim 6, wherein the at least two variables comprise a first variable and a second variable, wherein the statistical data comprises first statistical data about the first variable and second statistical data about the second variable, and wherein the first statistical data and the second statistical data are combined and provided as a combined input to the minimax regret model.

8. The one or more non-transitory computer-readable media of claim 6, wherein the minimax regret model is configured to use an expectation function for one or more of the at least two variables.

9. A system comprising:
one or more processors; and
one or more non-transitory computer readable media storing a database, code of a web-based service, and code for a quantity computing module that implements a minimax regret model,
wherein the web-based service is configured to:
receive, from a supplier device over a first application programming interface (API), supplier data about an item available from a supplier, the supplier data comprising supplier lead-time data;
receive, from an inventory device over a second API, inventory level data about the item; and
store the supplier data and the inventory level data in the database;
provide a search engine to a user device;
receive a search about the item from the user device based at least in part on the search engine; and
send, to the user device, a network-based document that includes a search result about the item from the database, the search result indicating an availability of the item based at least in part on an inventory plan;
wherein the quantity computing module is configured to:
receive historical realizations of at least two variables from an inventory computer system over a third API, the at least two variables associated with the item;
generate statistical data about the at least two variables based at least in part on the historical realizations of the at least two variables, on the supplier lead-time, and on the inventory level data; and
determine a quantity of the item to inventory based at least in part on the minimax regret model, the minimax regret model configured to select the quantity from a plurality of quantities of the item by at least generating a plurality of maximal regrets each corresponding to inventorying one of the plurality of quantities of the item, the plurality of maximal regrets generated by at least:
computing, for each one of the plurality of quantities and based at least in part on the statistical data, a realization of an optimization parameter and a maximal realization of the optimization parameter, and
computing, for each one of the plurality of quantities, a maximal regret based at least in part on the corresponding realization and maximal realization, selecting a regret of the plurality of maximal regrets based at least in part on the regret being the minimal of the plurality of maximal regrets, and determining the quantity corresponding to the selected regret; and send, to an inventory management system over the third API, the quantity, the quantity causing the inventory management system to update the inventory plan by at least replacing another quantity with the quantity, the inventory plan comprising an allocation of resources to inventory the quantity of the item based at least in part on the replacement.

10. The system of claim 9, wherein instructions when executed with the one or more processors further cause the system to at least: determine that distribution functions associated with the at least two variables are untrusted, and wherein the statistical data is accessed and used to compute the quantity of the item based at least in part on the distribution functions being untrusted.

11. The system of claim 10, wherein the distribution functions are determined to be untrusted based at least in part on an amount of the historical realizations of the at least two variables being statistically insufficient to generate the distribution functions.

12. The system of claim 10, wherein the instructions when executed with the one or more processors further cause the system to at least generate a plan to inventory the quantity of the item during a planning horizon, and wherein the distribution functions are determined to be untrusted based at least in part on a length of the planning horizon.

13. The system of claim 9, wherein the regret is selected based at least in part on a comparison of the plurality of maximal regrets.

14. The system of claim 9, wherein the minimax regret model is configured to determine the quantity of the item by reducing a maximal regret based at least in part on the statistical data being inputted to the minimax regret model as a combined input or based at least in part on using an expectation function for one or more of the at least two variables.

15. The system of claim 14, wherein the minimax regret model is configured to select between the combined input and the expectation function based at least in part on the item.

16. The system of claim 9, wherein the at least two variables comprise a demand variable, wherein the statistical data comprises demand data associated with the demand variable, wherein the demand data comprises means and variances representative of a plurality of distribution functions of the demand variable.

* * * * *